United States Patent Office 2,783,059
Patented Feb. 26, 1957

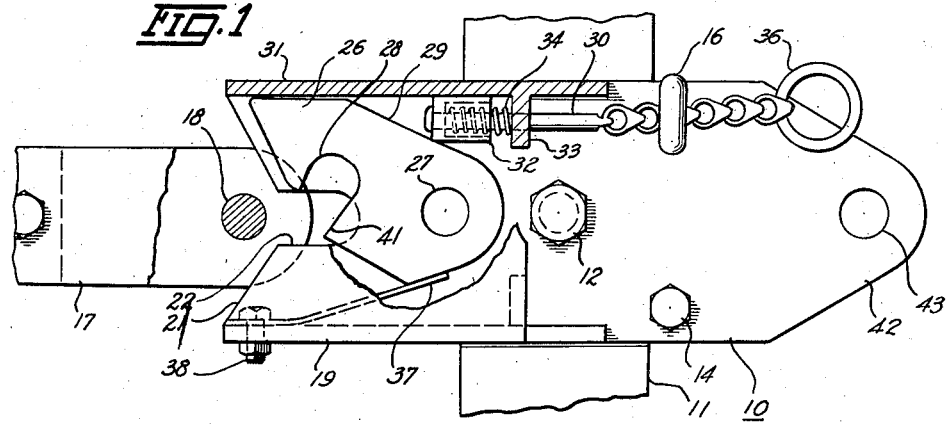
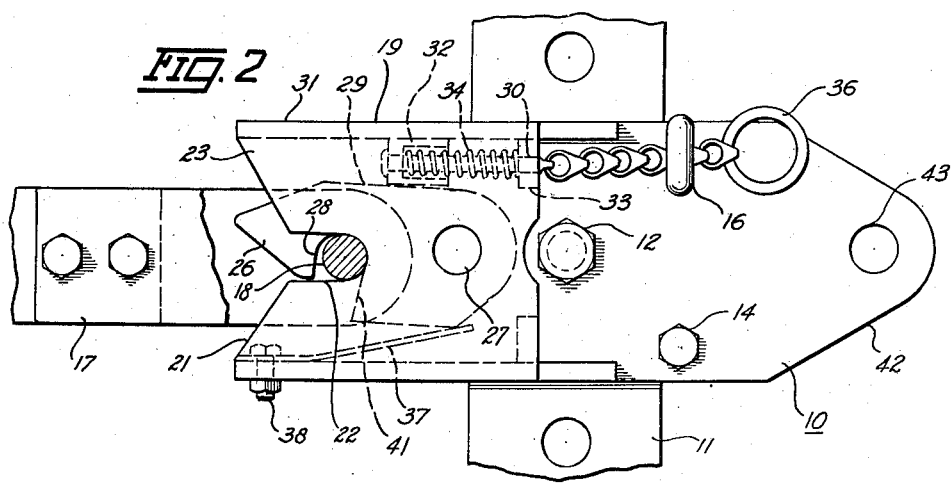
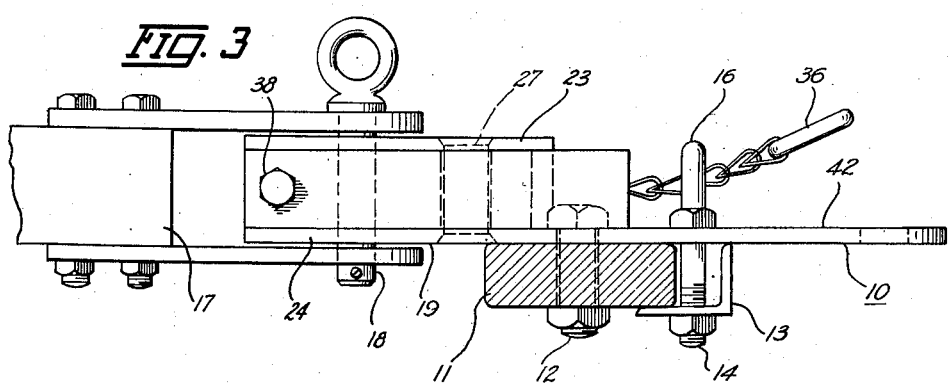
INVENTOR.
JOHN J. HARTL

2,783,059
SELF-COUPLING WAGON HITCH
John J. Hartl, Cedar Rapids, Iowa
Application March 5, 1954, Serial No. 414,431
1 Claim. (Cl. 280—509)

This invention relates to wagon hitches and has particular relation to a safety hitch adapted to automatically secure the tongue of a wagon or the like to a tractor or other vehicle.

It is a primary object of my invention to provide an improved, self-closing and self-locking wagon hitch which may be employed to couple a wagon or the like to another vehicle such as a tractor.

A further object of the invention is the provision of a device of this nature which is simple and rugged and of relatively inexpensive construction.

Other and further features and objects of the invention will be more apparent to those skilled in the art upon a consideration of the accompanying drawings and the following specification, wherein is disclosed a single exemplary embodiment of the invention, with the understanding, however, that such changes may be made therein as fall within the scope of the appended claim, without departing from the spirit of the invention.

In the drawings:

Figure 1 is a view in top elevation of a wagon hitch constructed in accordance with a preferred embodiment of my invention. Portions of the top wall of the housing have been broken away to better show the internal structure. The latching elements of the device are shown in position ready to engage the tongue of a wagon.

Figure 2 is a similar view of the same device but illustrating the mechanism in latched and locked position and, Figure 3 is a view in side elevation of the hitch as shown in Figure 2.

Referring now to the drawings in which my improved hitch is indicated generally by the numeral 10. The hitch is secured to the draw bar 11 of a tractor or the like by means of a bolt 12 and an angle clamp 13. The angle clamp 13 is bolted in place by means of the bolt 14 and the laterally spaced eye bolt 16. The tongue of a wagon being engaged by the hitch is illustrated at 17, the bifurcated end thereof having a hitch pin 18 extending vertically therein.

The hitch proper comprises a tubular housing 19 of generally rectangular cross section, a V shaped guideway 21 being provided at the rear end thereof for guiding the hitch pin 18 of the wagon tongue into the lock slots 22 which are provided in the upper and lower walls 23 and 24 of the tubular housing.

The hitch pin 18, when inserted into the lock slots 22, as illustrated in Figure 2, is retained therein by means of a hook plate 26. This hook plate is pivotally secured within the housing on the vertical pivot or hook pivot pin 27 and it will be noted that the hook opening 28 is so positioned that, when engaged over the hook pin 18, the longitudinal rear edge 29 of the hook plate is substantially parallel with the adjacent side wall 31 of the housing but spaced therefrom.

A blocking member 32 is adapted to be projected into the space between the hook plate and the side wall 31 of the housing to thereby secure the hook plate in locked position. This blocking member is a generally rectangular block affixed to a guide pin 30 which is, in turn, slidably mounted in a guide block 33. A compression locking spring 34 encircling the guide pin urges the blocking member rearwardly into blocking position between the hook plate and the adjacent wall 31 of the housing. A chain and ring 36 are secured to the forward end of the guide pin and the chain extends through and is guided by the eye bolt 16 to permit manual release of the locking mechanism by the operator of a tractor by engaging the ring with a hooked rod without necessitating the operator leaving his seat on the tractor. If desired, the locking mechanism may be released from the seat of a tractor by means of an extension chain or rope. A hooked rod such as mentioned above may also be used to engage the hitch pin 18 to lift the wagon tongue without the operator having to leave his seat on the tractor.

A leaf spring 37 is affixed within the housing by means of a bolt 38 in such manner as to bias the hook plate 29 toward its open or unlocked position.

The hook opening 28 is of sufficient depth to completely engage the hitch pin. It should be noted particularly that the forward face 41 of the hook opening 28 is of greater length than the depth of the hook opening. This forward face 41 of the hook is also inclined laterally and rearwardly away from the bottom of the hook opening as best shown in Figure 1 so that, when the hitch is forced rearwardly into engagement with the hitch pin, the pin engages the inclined face 41 to urge the hook into engaged position. To further facilitate this locking action, the lock slots 22 are slightly offset in the housing relative to the hook pivot pin 27 to provide, in effect, a bell crank or lever arm against which the pressure of the hitch pin 18 serves to close the hook plate.

It will be apparent that, once the hook is closed or engaged over the hitch pin, the pressure of the locking spring 34 will urge the blocking member 32 between the adjacent surfaces of the hook plate and the housing wall. It thus becomes a virtual impossibility for the hook to open and thus release the towed vehicle until the block 32 is manually removed by pulling upon the chain 36. When this blocking member is removed and any pressure in a forward or rearward direction on the hook is relieved, the leaf spring 37 will urge the hook plate toward the unlatched position.

The housing is preferably provided with a forward extension 42 having a second bolting hole 43 therein to permit bolting to other types of tractor draw bars than the one illustrated at 11 in the drawings.

Although I have shown and described a specific embodiment of my invention, it will be apparent that modifications thereof may be made by those skilled in the art. Such modifications may be made without departing from the spirit and scope of the invention as set forth in the appended claim.

I claim as my invention:

In a wagon hitch for engaging the hitch pin of a towed vehicle, a housing having a guide slot at the rear end thereof with V guideways leading thereinto, a hook-plate pivotally mounted in the housing with the pivot point longitudinally in line with the guideways and adapted to move transversely in the guide slot for engagement with the aforementioned hitch pin, a slidable rectangular blocking means for blocking the hook-plate to prevent disengagement from the hitch pin, means normally urging the blocking means into blocking position between the back side of the hook-plate and the adjacent wall of the housing, means for manually removing the blocking means from its blocking position and means normally urging the hook-plate out of engagement.

References Cited in the file of this patent
UNITED STATES PATENTS

| | | |
|---|---|---|
| 967,713 | Blom | Aug. 16, 1910 |
| 2,014,963 | Coder | Sept. 17, 1935 |
| 2,396,921 | Leslie | Mar. 19, 1946 |
| 2,522,951 | Knox | Sept. 19, 1950 |
| 2,547,772 | Peters | Apr. 3, 1951 |